(12) United States Patent
Depault (10) Patent No.: US 10,045,471 B2
(45) Date of Patent: Aug. 14, 2018

(54) SOIL WORKING APPARATUS

(71) Applicant: Marcel Depault, St-Simon-de-Bagot (CA)

(72) Inventor: Marcel Depault, St-Simon-de-Bagot (CA)

( * ) Notice: Subject to any disclaimer, the term of this patent is extended or adjusted under 35 U.S.C. 154(b) by 14 days.

(21) Appl. No.: 14/596,551

(22) Filed: Jan. 14, 2015

(65) Prior Publication Data

US 2016/0198620 A1    Jul. 14, 2016

(51) Int. Cl.
*A01B 21/04*    (2006.01)

(52) U.S. Cl.
CPC ..................... *A01B 21/04* (2013.01)

(58) Field of Classification Search
CPC ......... A01B 35/28; A01B 15/16; A01B 15/18; A01B 21/00–21/086; A01B 23/06; A01B 33/10–33/106; A01B 7/00; A01B 35/16; A01B 23/02
See application file for complete search history.

(56) References Cited

U.S. PATENT DOCUMENTS

| | | | | | |
|---|---|---|---|---|---|
| 1,737,179 | A | * | 11/1929 | Seitz .................. | A01L 333/103 172/556 |
| 2,734,439 | A | * | 2/1956 | Padrick .................. | A01B 49/04 111/121 |
| 2,749,827 | A | * | 6/1956 | Harfert .................. | A01B 21/02 172/549 |
| 3,040,819 | A | * | 6/1962 | Morkosid ............... | A01B 35/28 172/556 |
| 3,435,904 | A | * | 4/1969 | Rice ....................... | A01B 21/02 172/556 |
| 3,718,191 | A | * | 2/1973 | Williams ............... | A01O 5/062 111/140 |
| 4,192,388 | A | * | 3/1980 | Goebel .................. | A01G 25/09 111/193 |
| 4,231,433 | A | * | 11/1980 | Whitfield ............... | A01B 35/16 172/190 |
| 4,298,071 | A | * | 11/1981 | Whitfield ............... | A01B 35/16 172/624 |
| 4,629,007 | A | * | 12/1986 | Pegoraro .............. | A01B 33/142 172/548 |

(Continued)

*Primary Examiner* — Alicia Torres
*Assistant Examiner* — Adam J Behrens
(74) *Attorney, Agent, or Firm* — Norton Rose Fulbright Canada LLP (57) ABSTRACT

A soil working apparatus comprises a farm implement including: a first structure moveable above a soil surface along a travel direction; and a plurality of housings, each supporting at least one rotary hoe for forming a furrow in the soil along the travel direction. The housing has a mounting structure for pivotally mounting to the first structure, a radially extending support member having a rotary hoe at the distal end thereof. The rotary hoe mounting structure has a pivot member extending in a plane at right angles to the shaft and the rotary hoe is pivotally mounted to the pivot member for limited composite angular movement relative to a vertical plane and the direction of travel. The rotary hoe may have a star shape including: a central hub, a plurality of spaced apart, radially extending prongs extending from the hub in a common plane, and the prongs each being independently mounted to the hub but interlocked with each other when mounted on the hub.

8 Claims, 7 Drawing Sheets

(56) References Cited

U.S. PATENT DOCUMENTS

| | | | | |
|---|---|---|---|---|
| 4,759,411 | A | * | 7/1988 | Williamson ............ A01B 15/18 172/572 |
| 5,080,178 | A | * | 1/1992 | Dietrich, Sr. ........ A01B 21/086 172/153 |
| 6,067,918 | A | * | 5/2000 | Kirby .................... A01B 35/28 111/118 |
| 6,158,523 | A | * | 12/2000 | Gengler ................ A01B 15/18 172/572 |
| 6,776,107 | B1 | * | 8/2004 | Shoup .................... A01B 35/16 111/140 |
| 8,393,407 | B2 | * | 3/2013 | Freed .................... A01B 35/16 111/141 |
| 8,479,669 | B2 | * | 7/2013 | Shoup ................... A01B 35/16 111/135 |
| 2007/0125561 | A1 | * | 6/2007 | Depault ............... A01C 23/026 172/699 |

* cited by examiner

SOIL WORKING APPARATUS

TECHNICAL FIELD

The present disclosure relates to agricultural implements, particularly to soil working tools such as rotary hoes.

BACKGROUND ART

Known plowing implements may include a gang of spaced apart plows in the form of rotary hoes extending along a horizontal shaft. Rotary hoes are well known in the art. Examples are described in U.S. Pat. No. 3,734,201 Zaun 1973; U.S. Pat. No. 3,766,988 Whitesides 1973; U.S. Pat. No. 3,794,123 Whitesides 1974; U.S. Pat. No. 4,312,409 Mills 1982; and US published application 2007/0125561 Depault 2007. The latter published application is incorporated herein by reference.

However, there is a need for an improved farm implement comprising rotary hoes.

SUMMARY

It is therefore an aim to provide an alternative to existing soil working tool.

It is a further aim to provide a new rotary hoe.

Therefore, in accordance with a general aspect, there is provided a star shaped rotary hoe including: a central hub; a plurality of circumferentially spaced-apart prongs extending radially from the hub in a common plane; the prongs each being independently mounted to the hub but directly interlocked with each other when mounted on the hub.

More specifically, the prongs may have a base and a distal tip wherein the base includes a male lug and a female slot, such that the lugs and slots of each prong interlock with corresponding female slots and male lugs of adjacent prongs when mounted on the hub.

Still more specifically, the male lugs and female slots may be of the jigsaw puzzle type.

In accordance with another general aspect, there is provided a farm implement comprising: a first structure moveable above a soil surface along a travel direction; and a plurality of second structures, each mounted to the first structure about a transverse axis, for limited rotation thereabout. Each second structure supports at least one rotary hoe for forming a furrow in the soil along the travel direction upon movement of the first structure. The second structure has a radially extending support member, relative to the transverse axis, with a rotary hoe mounting structure at the distal end thereof. The rotary hoe mounting structure has a pivot axis defined, in the support member, in a plane at right angles to the transverse axis. A hub is mounted to the support member and intersects the pivot axis whereby the rotary hoe rotates on the hub in a plane at an acute angle to the direction of travel and at an acute angle to a vertical plane that includes the pivot axis.

According to a still further general aspect, the rotary hoe has a hub that provides a composite angle to the rotary hoe relative to a vertical plane in the direction of travel.

In yet a further aspect, there is provided a rotary hoe assembly adapted to be mounted to a farm implement including a first structure moveable above a soil surface along a travel direction; the rotary hoe assembly comprising: a housing adapted to be pivotally mounted to the first structure about a first axis transversal to the travel direction, a shaft mounted to the housing for rotation about a pivot axis substantially perpendicular to first axis; a rotary hoe mounted to a lower end of the shaft, the rotary hoe having a composite angle of inclination relative to a vertical plane in the direction of travel.

BRIEF DESCRIPTION OF THE DRAWINGS

Reference will now be made to the accompanying drawings, showing by way of illustration a preferred embodiment of the present invention and in which.

DESCRIPTION OF THE PREFERRED EMBODIMENTS

Figure 1:
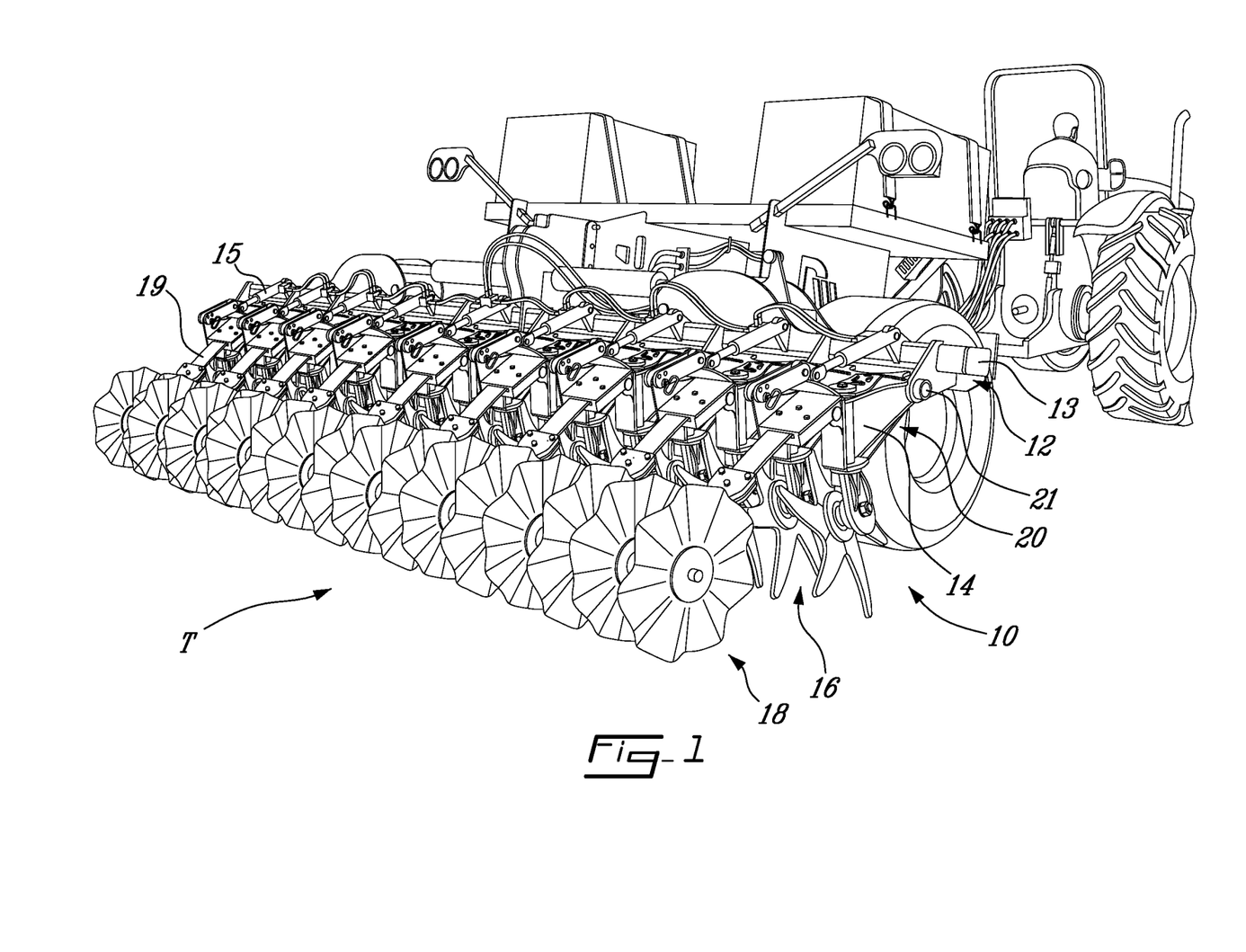
FIG. 1 is a perspective rear view of a farm implement including gangs of rotary hoes.

Referring now to FIG. 1, an apparatus indicated at 10, which is a soil working tool, that generally includes a first support structure 12 adapted to be pulled along a travel direction T by a motorized vehicle such as a tractor and a series of independent, second support structures 14 connected in a laterally spaced-apart manner along the first support structure 12. The second support structures 14 supports a first gang 16 of rotary hoes adapted to penetrate a soil surface to be dragged therein as the first support structure 12 is pulled along the travel direction T. In the embodiment shown in FIG. 1, a second gang 18 of rotary hoes is mounted from the second support structures 14.

Referring to FIG. 1, the second support structures 14 are made up of separate housings 20 each journalled to a shaft 21 extending parallel to a transverse axis to the direction of travel T, on the first support structure 12 as herein described. The first support structure 12 includes a beam 13 with brackets mounting the shaft 21. Individual hydraulic cylinders 15 articulate the housings 20.

The second gang 18 depends from the housings 20 by means of individual flat spring arms 19. The rotary hoes of gang 18 are of the corrugated type.

Figure 2A:
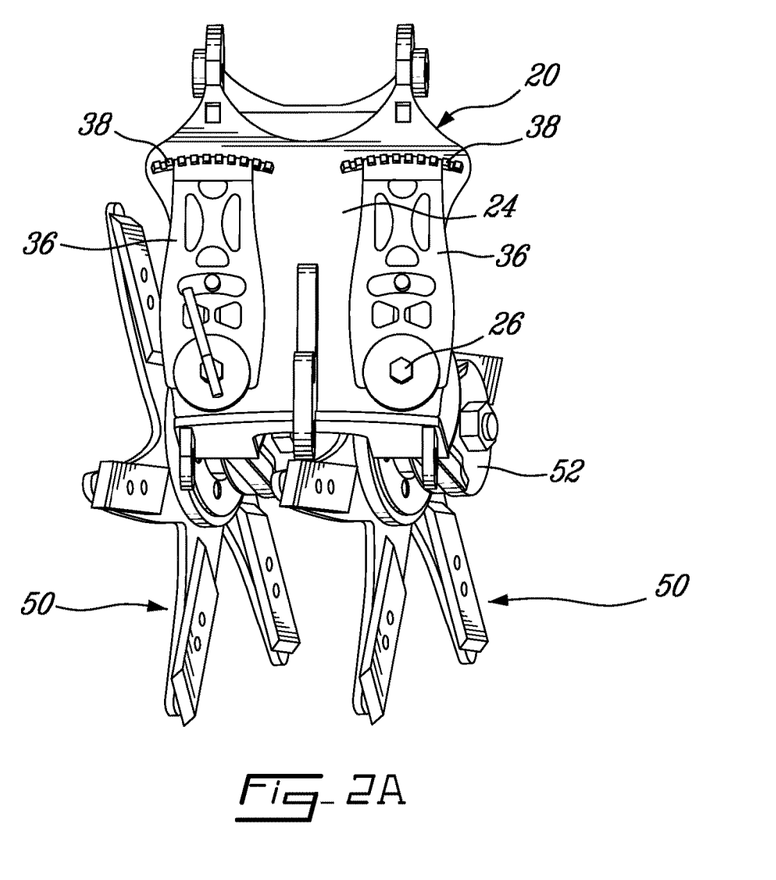
FIGS. 2A,2B are perspective top views of a pair of rotary hoes and their mounting housing, with the rotary hoes in different orientations relative to the direction of travel shown in FIG. 1.
Figure 2B:
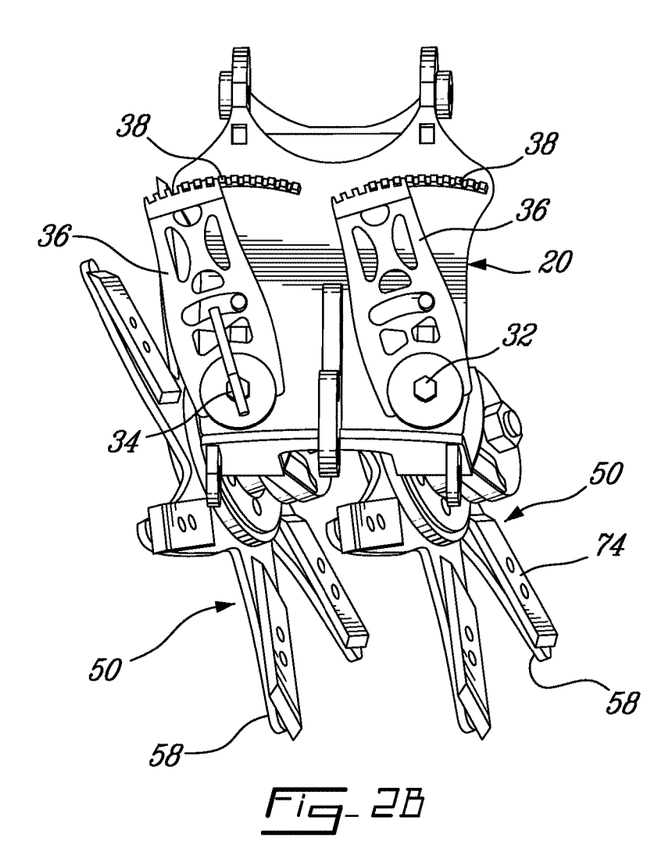
Figure 3A:
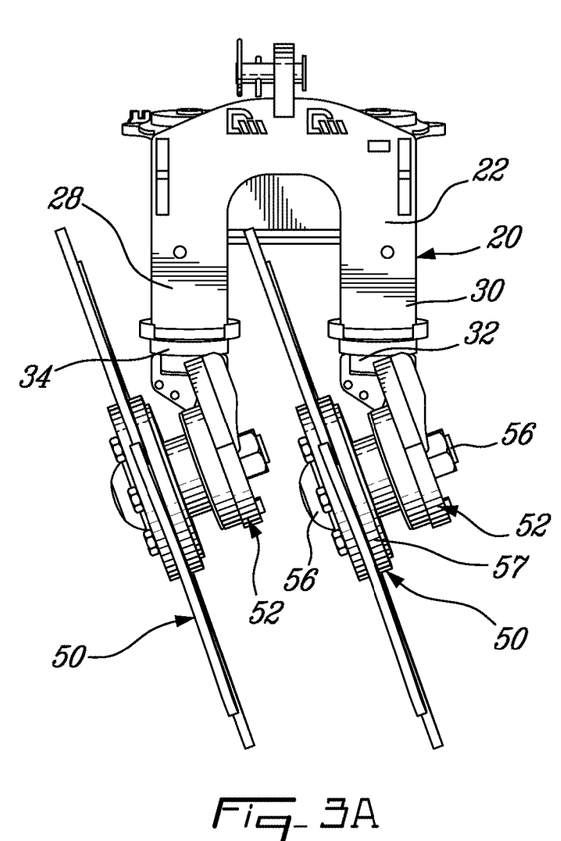
FIGS. 3A, 3B are perspective front views of the pair of rotary hoes and their mounting housing, with the rotary hoes in different angular operating positions.
Figure 3B:
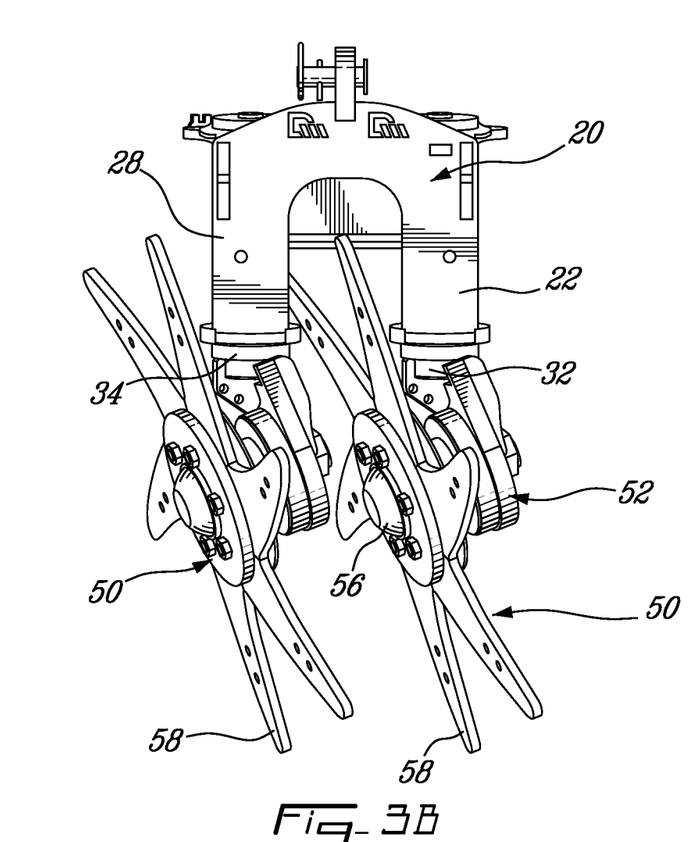

The housing 20 is shown in FIGS. 2A and 2B as well as in FIGS. 3A and 3B. The housing 20 includes a top wall 24 and a front wall 22 which are part of legs 28 and 30. A shaft 32 is journalled in the top wall 24 and extends through the leg 30. The shaft 32 is in a plane at right angles to the shaft 21. The distal end of the shaft 32 mounts the hub 52. The shaft 32 is fixed, at the top end, to a lever 36. The lever 36 may be rotated for a limited angular travel and may be locked in position by engaging an arcuate gear tooth segment 38. FIGS. 2A and 2B as well as FIGS. 3A and 3B, show two different angular positions (relative to the direction of travel T). The rotary hoe 50 is therefore, typically set at an acute angle to the direction of travel, as referred to in US published application 2007/0125561. Although only leg 30 and rotary hoe 50 assembly has been described, each housing 20 is provided with a duplicate leg 28 and rotary hoe 50 assembly so that each housing mounts a pair of rotary hoes 50.

Although the rotary hoes 50 provide a more accessible furrow when angled to the direction of travel T, they tend to plow the earth forward, increasing stresses on the rotary hoes 50. These stresses are released however when the plane of rotation of the rotary hoe 50 is set at an acute angle relative to a vertical plane. A composite angle having an inclination from the vertical and from the direction of travel T is provided. In this manner the rotary hoe 50 tends to move the earth out of the furrow as it advances. FIG. 3A especially, shows the acute angle of the plane of the rotary hoe 50 relative to a vertical plane. The acute angle may vary between about 10° and about 25° from the vertical plane. The preferred angle is about 20°.

Figure 4:
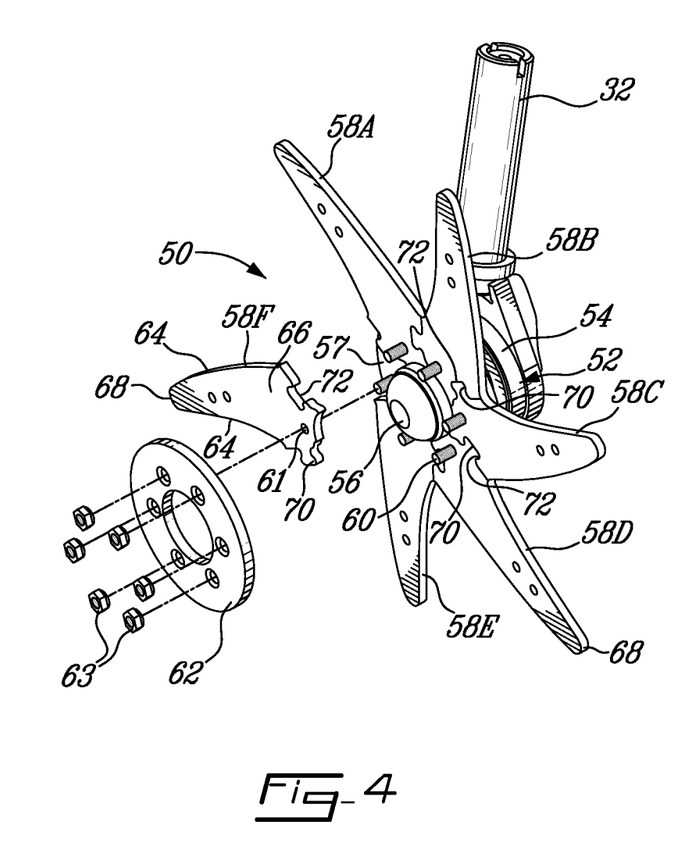
FIG. 4 is an exploded, perspective, side view of a rotary hoe with one of the prongs removed.

Referring to FIG. 4, the hub 52 includes a bearing 54 and a stub shaft 56. A first annular plate 57 is provided to mount the prongs 58. The rotary hoe 50 has a star shaped configuration made up of individual prongs 58A, 58B, 58C, 58D, 58E and 58F. Prong 58F, for example, includes arcuate edges 64a and 64b, a base 66 and a tip 68. At the base of the prong 58F, there is provided a lug 70 at the side edge 64a and a slot 72 at the side edge 64b. The lug 70 and slot 72 have a jigsaw puzzle type shape, as shown. Thus when the prongs 58 are mounted to form the rotary hoe 50, lugs 70 engage slots 72 of adjacent prongs 58.

The prongs 58A-58F are mounted to the hub 52 by means of bolts 60 fixed to the annular plate 57 and passing through bores 61 in the base 66 to engage a cover plate 62 and nuts 63.

Figure 5:
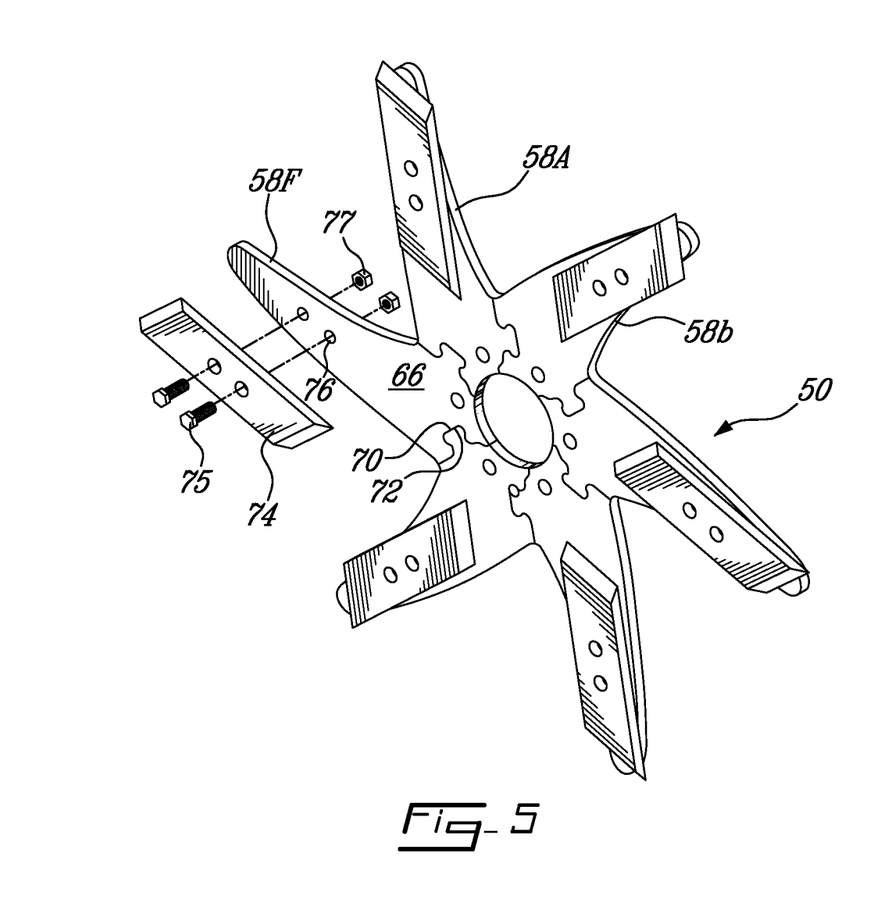
FIG. 5 is a partially exploded, perspective, side view of the assembled prongs with an insert removed.

As shown in FIG. 5, the prongs 58A-58F may be provided with hardened inserts 74. In this case bores 76 are provided on, for example, prong 58F by means of bolts 75 passing through bores 76 and secured by nuts 77.

The scope of the claims should not be limited by the preferred embodiments set forth in the examples, but should be given the broadest interpretation consistent with the description as a whole.

The invention claimed is:

1. A farm implement comprising: a first structure moveable above a soil surface along a travel direction; and a plurality of second structures, each mounted to the first structure about a transverse axis, for limited upward and downward rotation thereabout; each second structure supporting at least one rotary hoe for forming a furrow in the soil along the travel direction upon movement of the first structure; each second structure having a shaft rotatable about a shaft axis perpendicular to the transverse axis; and a rotary hoe mounting structure at the distal end of the shaft; the rotary hoe mounting structure comprising a hub mounted to a stub shaft extending at an acute angle to the shaft axis, whereby a rotation plan of the rotary hoe is set at an acute angle to a vertical plane that includes the shaft axis, wherein the at least one rotary hoe comprises a plurality of circumferentially spaced-apart prongs extending radially from the hub in a common plane; the prongs being independently mounted to the hub but directly interlocked with each other when mounted on the hub, wherein each of the prongs has a lug engageable in a corresponding slot defined in an adjacent one of the prongs.

2. The farm implement according to claim 1, wherein the rotary hoe rotates in a plane at a composite angle to the vertical plane in the direction of travel.

3. The farm implement according to claim 1, wherein the acute angle to the vertical plane that includes the pivot axis is in a range of between 10° and 25°.

4. The farm implement according to claim 2, wherein the composite angle includes an acute angle to the vertical plane that is set at 20°.

5. The farm implement according to claim 2, wherein the hub is mounted on the shaft for limited angular orientation relative to the direction of travel.

6. The farm implement according to claim 5, wherein the support member includes a top wall to which the shaft is journalled, wherein a lever is fixed to the shaft and rotatable with the shaft on the top wall, and wherein an arcuate gear tooth segment is provided for locking the lever in a position with the rotary hoe in a plane at an acute angle to the direction of travel.

7. The farm implement according to claim 1, wherein the lug and the slot have a jigsaw puzzle shape.

8. The farm implement according to claim 1, wherein the lug and the slot are defined in opposed sides edges of the prongs.

\* \* \* \* \*